US008358506B2

(12) United States Patent
Cooper et al.

(10) Patent No.: US 8,358,506 B2
(45) Date of Patent: Jan. 22, 2013

(54) MECHANICAL ARRANGEMENT FOR USE WITHIN GALVANICALLY-ISOLATED, LOW-PROFILE MICRO-INVERTERS FOR SOLAR POWER INSTALLATIONS

(75) Inventors: Frank G. Cooper, Dix Hills, NY (US); Eric J. Hoffman, Middleton, WI (US)

(73) Assignee: Direct Grid Technologies, LLC, Edgewood, NY (US)

( * ) Notice: Subject to any disclaimer, the term of this patent is extended or adjusted under 35 U.S.C. 154(b) by 204 days.

(21) Appl. No.: 12/807,097

(22) Filed: Aug. 27, 2010

(65) Prior Publication Data

US 2012/0050999 A1 Mar. 1, 2012

(51) Int. Cl.
*H05K 7/20* (2006.01)
(52) U.S. Cl. ........ 361/714; 361/704; 361/705; 361/707; 361/722
(58) Field of Classification Search .................. 361/704, 361/705, 707, 714, 722
See application file for complete search history.

(56) References Cited

U.S. PATENT DOCUMENTS

| | | | | |
|---|---|---|---|---|
| 4,845,590 | A * | 7/1989 | Mikolajczak | 361/720 |
| 4,891,735 | A * | 1/1990 | Mikolajczak | 361/809 |
| 5,003,429 | A * | 3/1991 | Baker et al. | 361/704 |
| 5,138,523 | A * | 8/1992 | Benck et al. | 361/679.54 |
| 5,402,313 | A * | 3/1995 | Casperson et al. | 361/710 |
| 5,590,026 | A * | 12/1996 | Warren et al. | 361/704 |
| 6,043,981 | A * | 3/2000 | Markow et al. | 361/704 |
| 6,147,866 | A * | 11/2000 | Saito et al. | 361/704 |
| 6,757,171 | B2 * | 6/2004 | Bauer et al. | 361/719 |
| 6,870,738 | B2 * | 3/2005 | Goebl | 361/719 |
| 6,873,530 | B2 * | 3/2005 | Belady et al. | 361/719 |
| 7,006,354 | B2 * | 2/2006 | Mochizuki et al. | 361/705 |
| 7,042,725 | B2 * | 5/2006 | Martin et al. | 361/699 |
| 7,164,586 | B2 * | 1/2007 | Lin | 361/714 |
| 7,242,585 | B2 * | 7/2007 | Fukuma et al. | 361/719 |
| 7,372,704 | B2 * | 5/2008 | Jeong | 361/719 |
| 7,576,988 | B2 * | 8/2009 | Schwarz | 361/704 |
| 7,715,196 | B2 * | 5/2010 | Chen et al. | 361/719 |
| 7,974,098 | B2 * | 7/2011 | Oki et al. | 361/715 |
| 8,014,152 | B2 * | 9/2011 | Nishiuma et al. | 361/719 |
| 8,059,409 | B2 * | 11/2011 | Steenwyk et al. | 361/710 |

* cited by examiner

*Primary Examiner* — Anatoly Vortman
(74) *Attorney, Agent, or Firm* — Steven S. Rubin, Esq.; Moritt Hock & Hamroff LLP

(57) ABSTRACT

A mechanical arrangement for use in implementing a galvanically-isolated, low-profile micro-inverter primarily, though not exclusively, intended for use with solar panels. The micro-inverter contains a circuitry assembly having a planar transformer formed of two abutting E-shaped core halves, and a chopper device assembly with all chopper devices mounted to a common thermally-conductive plate. To provide passive cooling, heat conduction paths are established, via separate compressive thermally-conductive pads, from a top surface of a top core half of the transformer and from a bottom surface of the conductive plate to large-area portions of opposing internal surfaces of top and base portions, respectively, of an enclosure. The enclosure portions, once secured together to house the circuitry and chopper device assemblies, exert a physical force through the compressive pads to effectively clamp the core halves together and eliminate air gaps that might otherwise form between abutting portions of the core halves.

15 Claims, 4 Drawing Sheets

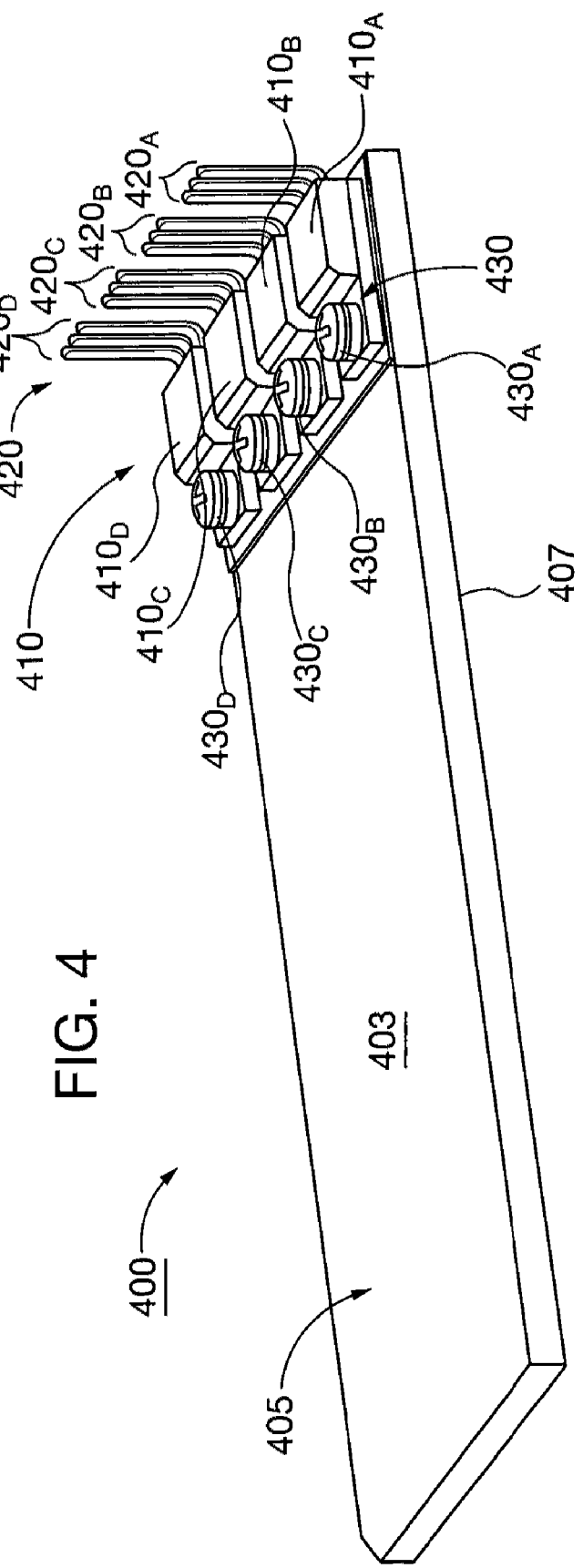

MECHANICAL ARRANGEMENT FOR USE WITHIN GALVANICALLY-ISOLATED, LOW-PROFILE MICRO-INVERTERS FOR SOLAR POWER INSTALLATIONS

BACKGROUND OF THE DISCLOSURE

1. Field of the Invention

The invention relates to a galvanically-isolated, low-profile micro-inverter primarily, though not exclusively, intended for use in solar power installations and particularly to an advantageous mechanical arrangement for implementing the micro-inverter.

2. Description of the Prior Art

Currently an increasing worldwide emphasis is being placed on exploiting clean, renewable energy sources rather than fossil fuels. One such source that is receiving considerable attention in the marketplace is solar energy. It is readily abundant, weather permitting, in a wide multitude of locales and across widely differing climates.

In essence, an amount of solar energy is harvested and converted into electrical power which, in turn, is either used to power local loads and/or fed to a power grid for consumption at remote locales from the point at which the energy was harvested. To do so, a matrix of inter-connected photovoltaic elements, called a "solar panel" is aimed at the sun and converts incident solar radiation into a direct current (DC) output. Oftentimes, this DC output is converted through a companion micro-inverter, into appropriate alternating current (AC) line power, to provide an electrical power source for powering local line-powered devices and/or supply the resultant AC power as input to a power grid. The micro-inverter generally employs internal DC-to-DC converter and chopper stages with the DC-to-DC converter being used to change, with relatively little loss, the DC output voltage produced by the solar panel to a level suitable for efficient conversion to the power line AC level.

Oftentimes, a solar power installation utilizes individual assemblies of one or two panels that are mounted to a racking system. The output of the panels in each single assembly is connected to a micro-inverter which, itself, is mounted to the assembly but directly behind the racking system.

Such a conventional approach carries a number of practical constraints. First, to generate a sufficient amount of power for a given application, quite a number of solar panel assemblies may well be needed. Since each assembly has its own micro-inverter, then correspondingly a considerable number of micro-inverters may be needed. To provide requisite economic viability of a solar installation in light conventional utility service pricing, each entire assembly certainly including the micro-inverter must be relatively low cost. Further, limited space exists directly behind a racking system, so that each micro-inverter must fit into a relatively low-profile enclosure, typically not more than 1.25" (approximately 3.2 cm) thick. Also, as micro-inverters will be exposed to the same harsh environment as a solar panel with a lack of active external cooling systems, each micro-inverter must be completely sealed and passively cooled.

In addition, for safety reasons, each micro-inverter should galvanically isolate its DC power input from its AC output. To achieve galvanic isolation, a transformer would generally be employed within the DC-to-DC converter stage. However, doing so would require a low-profile transformer thin enough to fit within a 1.25" thick micro-inverter enclosure. Unfortunately, such a transformer is not commonly available, and would thus need to be both designed and manufactured on a custom basis. This, in turn, could potentially and disadvantageously add considerable expense to the cost of the micro-inverter. Consequently, to reduce cost, various manufacturers of conventional micro-inverters, currently available in the commercial marketplace and designed for solar panel use, apparently and unfortunately forego the benefits of providing an isolated AC output by choosing instead to rely on a non-isolated, buck-style DC-to-DC converter design that does not utilize a transformer.

Therefore, a need exists in the art for a low-profile micro-inverter primarily, though not exclusively, suited for use in solar power applications that not only is relatively low cost, completely sealed and passively cooled and fits within available space behind a solar panel racking system in a solar panel assembly, but also and rather advantageously provides galvanic isolation between its DC input and AC output. It is expected that, over time, such a micro-inverter, which overcomes deficiencies inherent in conventional solar power micro-inverter, designs, might likely experience considerable interest and commercial use in solar power installations.

SUMMARY OF THE INVENTION

We advantageously satisfy this need and overcome the deficiencies in the art through our inventive mechanical arrangement particularly, though not exclusively, for implementing a micro-inverter.

To provide galvanic isolation while reducing component height, we utilize a transformer, preferably a planar transformer, within our micro-inverter. The planar transformer is preferably formed of top and bottom abutting E-shaped core halves which, when properly positioned, sandwich and extend through a main printed circuit board and at least one, and here preferably two, daughter boards, all of the boards being parallel to each other. Each of the daughter boards lies adjacent to a different side of the main printed circuit board. The primary winding of the transformer is formed by a continuous wiring trace on the main board, while a continuous wiring trace on each of the daughter boards collectively forms the transformer secondary winding.

Two components of the micro-inverter typically generate appreciable heat compared to others: the planar transformer core and chopper devices, the latter typically being power field effect transistors—FETs—that form an H-bridge.

In accordance with our specific inventive teachings, a thermally-conductive pad is situated across an upper surface of the top core half. The lower surface of the bottom core half abuts against a conductive plate of appropriate thickness. A similar conductive pad is situated across a lower surface of the plate. The chopper devices are mounted directly on and in thermal contact with the plate. The leads of each of the chopper devices are preferably bent upward and extend through corresponding holes on the main board and are soldered to conductive pads at the top of those holes and which connect to wiring traces on that board.

A resulting assembly of the main board and the conductive plate is positioned within an internal cavity of a base of an enclosure. The enclosure is formed of a thermally-conductive material such as aluminum. The main board is secured to the base through corresponding screw posts formed in the cavity. An enclosure top (lid) portion, also having an internal cavity, is the mounted into position over the main board and an enclosure base portion, and is secured in place through various screws threaded through holes along an outer wall of the top into corresponding threaded holes along an outer wall of the base. Once fastened together, the top and base portions of the enclosure, together with associated gaskets in those portions, fully seal the micro-inverter.

The internal cavities in the enclosure top and bottom portions are appropriately sized, along with the thickness of the conductive plate, to: (a) ensure that both thermally-conductive pads securely and substantially, if not completely, thermally contact and abut against opposing inner surfaces of the top and base portions of the enclosure so as to passively conduct heat away from the top core half and the conductive plate to opposing large-area inner surfaces of the top and base portions of the enclosure; (b) permit the top and base portions of the enclosure to collectively and continuously exert a sufficient mechanical force through both thermally-conductive pads, to not only compress each pad (generally slightly) and provide increased thermal conductivity between both the top core half and conductive plate to the enclosure but also apply a compressive force ultimately to both of the core halves that drives abutting portions of the halves closer together and substantially, if not totally, eliminates any air gap that would otherwise form between them; and also (c) accommodate the height of all other components on the main circuit board. By virtue of the rather low thermal resistance of the abutting mechanical thermal paths formed between the top surface of the top core half and the enclosure top portion, and between the conductive plate and the enclosure base portion, heat generated by the core and chopper devices is readily conducted to the enclosure from which it is passively dissipated.

Advantageously, the inventive arrangement advances the state of the art by now teaching how a low-profile micro-inverter, that provides galvanic isolation through use of a planar transformer, could be implemented.

BRIEF DESCRIPTION OF THE DRAWINGS

The teachings of the present invention can be readily understood by considering the following detailed description in conjunction with the accompanying drawings, in which:

FIG. 4 depicts chopper device assembly 400 which forms a portion of circuitry assembly 200 shown in FIG. 2.

To facilitate understanding, identical reference numerals have been used, where possible, to designate identical elements that are common to two or more of the figures.

DETAILED DESCRIPTION

Figure 1:
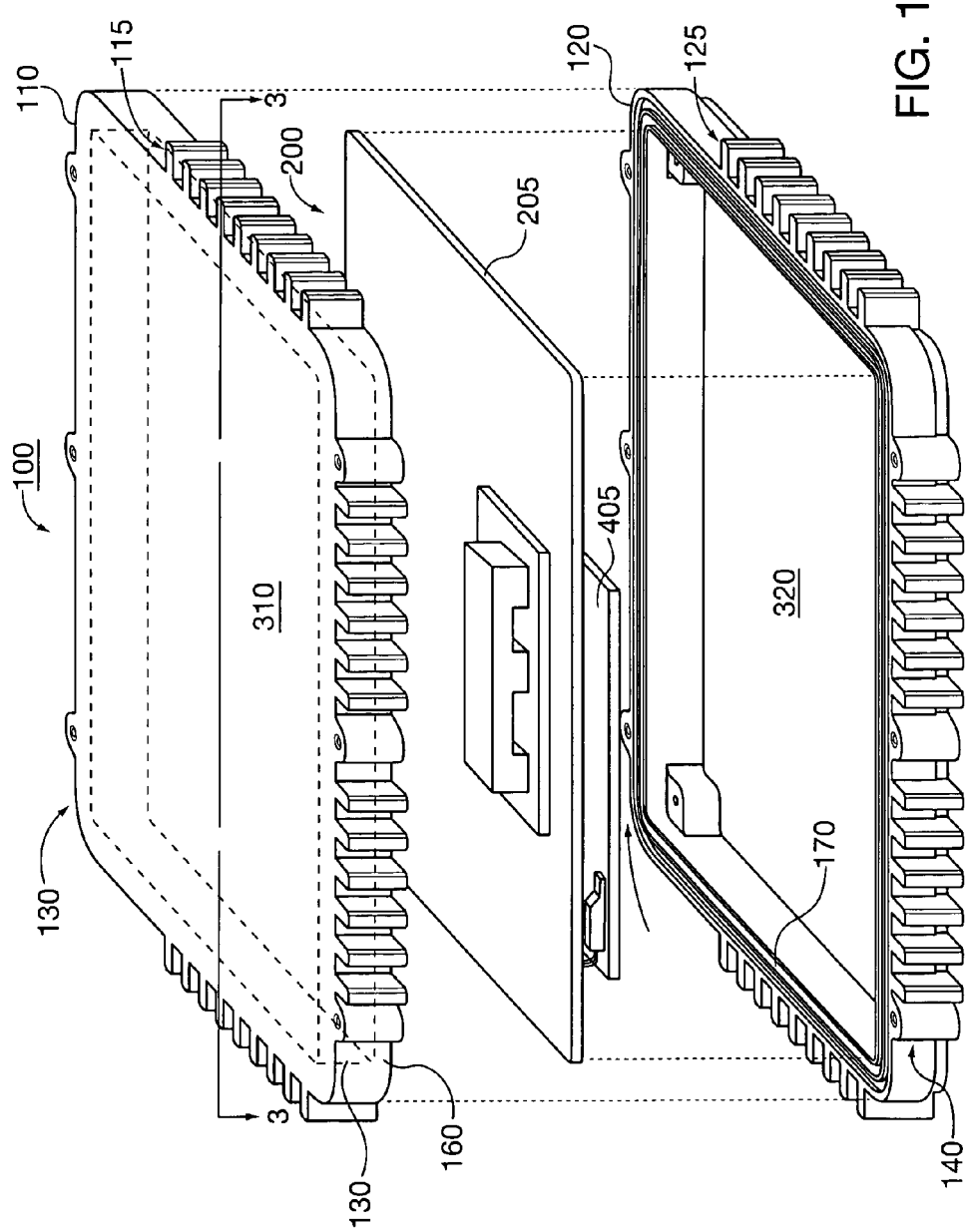
FIG. 1 depicts an exploded perspective view of an inventive embodiment of micro-inverter 100.

After considering the following description, those skilled in the art will clearly realize that the teachings of our present invention could be utilized in a wide range of electronic applications that could beneficially employ a planar transformer but are constrained to house the attendant circuitry, including the transformer, in a low-profile enclosure and solely rely on passive cooling. For ease of discussion, we will discuss our invention in the context of its use in implementing low-profile micro-inverters, for solar installations, that will convert a direct current output supplied by a photovoltaic panel into alternating current output line power.

In such installations, a micro-inverter is generally mounted directly behind a solar panel racking system which, due to available space, limits the thickness of its enclosure to no more than 1.25" (approximately 3.2 cm), thus necessitating a low-profile enclosure. Further, the micro-inverter should galvanically isolate its AC line output from its incoming DC power generated by the photovoltaic panel.

To provide these features, one skilled in the art might consider utilizing a planar transformer, within a DC-to-DC converter stage of the micro-inverter. As is conventionally known, such a transformer employs two abutting E-shaped halves of a ferrite core which pass through and are oriented normal to winding traces formed on multiple, stacked, parallel printed circuit boards. The traces of the various boards form both the primary and secondary windings of the transformer. While such a transformer can be readily manufactured to have sufficiently low-height, it has various inherent limitations, which to our knowledge, have thus far rendered it unsuitable for use in low-profile micro-inverter. First, printed circuit trace-based windings exhibit a relatively low magnetic area. According, the transformer has to be operated at a relatively high switching frequency, such as greater than approximately 70 kHZ, to achieve appreciable power throughput. However, such high switching frequencies produce core losses that manifest as heat. Second, further heating occurs from a relatively low amount of copper in the so-called "transformer window" of the trace-based windings (i.e., a cross-section taken through the windings in a direction normal to the direction of magnetic flux flow through those windings) as compared to that of more conventional windings implemented from copper wire. Less copper in a winding yields greater resistance which, for a given amount of current flow through that winding, generates increased heat in the windings which, in turn also heats the core. To ensure proper operation, heat, from whatever source, has to be sufficiently removed from the core. Third, the two core halves would need to be tightly held together to remove an air gap that would likely otherwise form between them causing magnetic losses in the transformer, and to reduce noise and vibration that would arise due to magnetic forces operating on the core halves.

Our inventive arrangement advantageously overcomes these drawbacks, by providing, through its mechanical configuration, internal thermal paths that effectively conduct heat away from the transformer, as well as other major heat-generating components of the micro-inverter, to large surface areas of the enclosure such that the entire micro-inverter can be passively cooled, and, just as importantly, the micro-inverter can be housed in a low-profile enclosure. The arrangement also substantially, if not totally, eliminates air gaps from occurring between abutting portions of the core halves. Consequently, our arrangement is able to advantageously implement, through use of an internal planar transformer, galvanic isolation—in contrast to conventional solar micro-inverters currently available in the commercial marketplace which do not. Further, since a planar transformer—as is known in the art—is relatively low cost and relatively simple to manufacture, our inventive micro-inverter is rather economical, both in terms of part and manufacturing costs and thus ideal for use in a micro-inverter designed for solar power applications.

FIG. 1 depicts an exploded perspective view of an inventive embodiment of micro-inverter 100. As shown, the micro-inverter is formed of assembly 200, which as will be described in detail contains main printed circuit board 205 and thermally-conductive plate 405, situated within enclosure top portion (lid) 110 and enclosure base (bottom) portion 120. Both enclosure portions are typically made from aluminum or other structurally suitable material (i.e., possessing adequate physical strength and other pertinent mechanical characteristics) having sufficient thermal-conductivity. During manufacturing, assembly 200 is suitably mounted within internal cavity 320 of enclosure base portion 120 and is then affixed through well-known screws (not shown) extending through holes in assembly 200 into corresponding screw posts (also not shown) formed in the enclosure base portion. Top portion 110 is then appropriately positioned over assembly 200 and base portion 120 with that assembly extending upward into internal cavity 310 formed within the top portion. The enclosure portions are then secured together through conventional screws (not shown) extending through screw holes existing in bosses 130 into threaded holes in bosses 140 located in the enclosure top and base portions, respectively. Appropriate gaskets (also conventional and not shown) are situated in abutting surfaces 160 and 170 of enclosure portions 110 and 120, respectively. To facilitate environmental sealing of the enclosure, portions 110 and 120 have fins 115 and 125, respectively (though the particular shape and size of the fins are generally not critical). Once appropriately secured, enclosure 100 has a thickness of approximately 1.25" (approximately 3.2 cm) to accommodate available space directly behind a solar panel racking system and is secured to that system through a conventional mounting flange (not shown) that is integral with and extends out laterally from a bottom of enclosure base portion 120.

Figure 2:
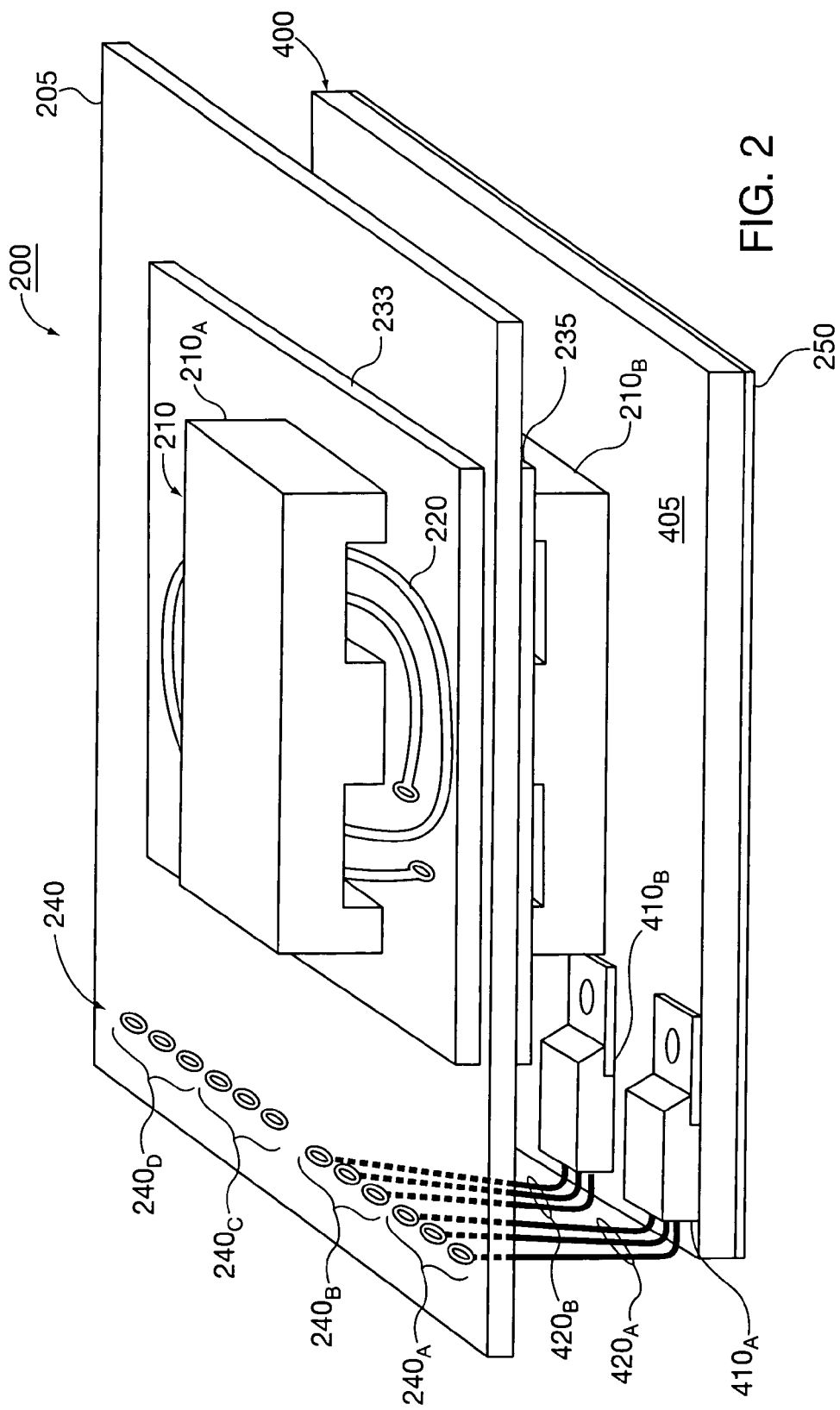
FIG. 2 depicts a simplified, perspective view of circuitry assembly 200 used within micro-inverter 100.
Figure 3:
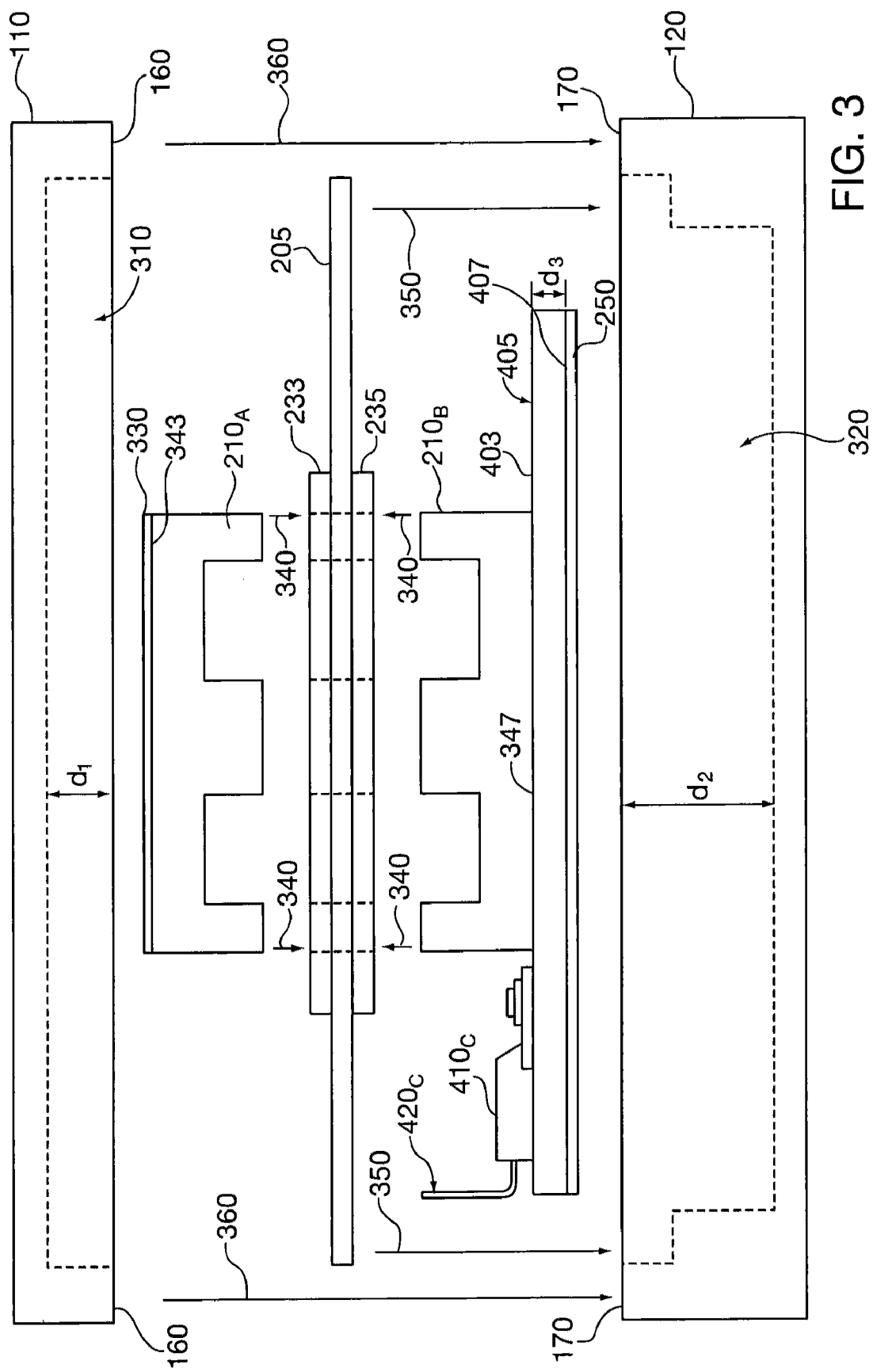
FIG. 3 depicts a simplified, cross-sectional view of micro-inverter 100 taken along lines 3-3 shown in FIG. 1.

To enhance understanding and with the above in mind, the reader should simultaneously refer to FIGS. 2-4 throughout the following discussion.

Specifically, FIG. 2 depicts a simplified perspective view of circuitry assembly 200 used within micro-inverter 100. FIG. 3 depicts a simplified cross-sectional view of micro-inverter 100 taken along lines 3-3 shown in FIG. 1. FIG. 4 depicts chopper device assembly 400 which forms a portion of circuitry assembly 200 shown in FIG. 2.

As shown, circuitry assembly 200 contains main printed circuit board 205 and chopper device assembly 400. Board 205 contains a planar transformer containing ferrite core 210 having two identical abutting E-shaped ferrite cores halves, specifically upper core half $210_A$ and lower core half $210_B$. A primary winding (not shown) is formed, through a suitable trace pattern, on main board 205 with secondary windings formed, again through suitable trace patterns, on each of daughter boards 233 and 235. The secondary patterns on both daughter boards are appropriately interconnected through appropriate connections (not shown) to electrically implement a complete secondary winding. The daughter boards sandwich the primary winding on the main board, with each daughter board situated adjacent to but along an opposing side of the main board and either above or below the primary winding. As shown by arrows 340 in FIG. 3, both core halves are positioned together such that they extend perpendicularly into main board 205 and the daughter boards, and abut against each other in a manner such that there is no appreciable, if any, air gap between any abutting portions of the core halves. As depicted in FIG. 2, for purposes of illustration, secondary wiring pattern 220 is shown as a single trace having a simple helical pattern, though, in actuality, the trace will be considerably wider than shown to minimize its resistive losses.

Compressive thermally-conductive pad 330 is affixed, typically by a suitable thermally-conductive, pressure-sensitive adhesive, to top surface 343 of top core half $210_A$ (pad 330 is not shown in FIG. 2 to simplify that figure). Pad 330 is preferably sized to cover appreciably all the surface area of top surface 343. Bottom surface 347 of bottom core half $210_B$ abuts against top surface 403 of conductive plate 405 of chopper device assembly 400. In the embodiment shown, plate 405 is preferably formed from aluminum and is approximately 0.125" (approximately 0.32 cm) thick (though other similarly thermally-conductive materials having sufficiently structural strength and other salient physical characteristics may be used instead). This plate, being thermally conductive, provides a very low-resistance path to effectively conduct heat away from lower core half $210_B$.

The predominant heat generating components in micro-inverter 100 are ferrite core 210 and chopper devices (here being FETs) 410, the latter being four power FETs $410_A$, $410_B$, $410_C$ and $410_D$ electrically connected in a commutating H-bridge configuration. The FETs tend to collectively generate a similar amount of heat as does the ferrite core. Accordingly to conduct heat away from FETs 410, all the FETs are mounted on and hence abut against top surface 403 of conductive plate 405. The FETs are conventionally secured to the plate through screws and washers 430, specifically screws $430_A$, $430_B$, $430_C$ and $430_D$ respectively extending through corresponding holes in mounting tabs of FETs $410_A$, $410_B$, $410_C$ and $410_D$ and from there into suitably threaded holes through top surface 403 into plate 405. Plate 405 provides a very low resistance path to conduct heat away from not only the lower core half but also all the chopper devices. Electrical leads 420 from chopper devices 410 extend upward from the chopper devices and plate 405 and pass through corresponding component holes and physically terminate, by soldering, in associated wiring pads 240 (specifically pads $240_A$, $240_B$, $240_C$ and $240_D$ for leads $420_A$, $420_B$, $420_C$, and $420_D$, respectively, emanating from corresponding FETs $410_A$, $410_B$, $410_C$ and $410_D$) in associated wiring traces (not shown) appearing on main board 205. Advantageously, mounting all the FETs in this fashion, with their component bodies physically secured to plate 405 and all their leads extending upwardly and physically secured to main board 205, effectively maintains main board 200 and chopper device assembly 400 in proper alignment, thus simplifying their subsequent installation within cavity 320 in enclosure base portion 120, as indicated by arrows 350 in FIG. 3.

Compressive thermally-conductive pad 250, formed of a similar material as pad 330, is affixed, here too again by a suitable thermally-conductive, pressure-sensitive adhesive, to cover appreciably all of bottom surface 407 of conductive plate 405.

Internal cavities 310 and 320 in enclosure top and base portions 110 and 120 are appropriately sized in terms of their corresponding depths $d_1$ and $d_2$, along with thickness, $d_3$, of conductive plate 405, to: (a) accommodate the height of all other components on main circuit board 205; (b) ensure that both thermally-conductive pads 330 and 250 securely and substantially, if not completely, through their available surface area contact and abut against opposing inner surfaces of the top and base portions 110 and 220 of the enclosure so as to passively conduct heat away from top core half $210_A$ and conductive plate 405 to opposing large-area inner surfaces of the top and base portions 110 and 120; and (c) permit enclosure portions 110 and 120, once they are fastened together, to continuously exert sufficient mechanical force through thermally-conductive pads 250 and 330, to not only slightly compress each of these pads and provide increased thermal conductivity from top core half $210_A$ and conductive plate 405 to the enclosure (specifically enclosure top portion 110 and enclosure base portion 120) but also apply a compressive force to both of the E-core halves $210_A$ and $210_B$ that drives the abutting portions of the halves towards each other, effectively clamping both halves together, and substantially, if not totally, eliminates any air gap that would otherwise form between them. This configuration advantageously eliminates a need, otherwise occurring, to use either core clips or ferrite epoxy to hold the core halves together, thus saving both part and manufacturing cost. By virtue of the rather low thermal resistance of the abutting mechanical connections formed between top surface 343 of top core half $210_A$ to enclosure top portion 110 and conductive plate 405 to enclosure base portion 120, heat generated by ferrite core 210 and chopper devices 410 is readily conducted to the enclosure from which it is passively dissipated to an ambient environment.

We have constructed actual micro-inverters embodying the present invention for producing, at full input power, approximately 460 watts of AC power output. During normal operation and through passive cooling provided by our invention, the micro-inverters—particularly their transformer core halves and all the chopper devices, while operating for prolonged intervals at full output power, advantageously remained cool to the touch.

Though a trace pattern for secondary winding 220 of the planar transformer is illustratively shown in FIG. 2 as being a single helical loop, other geometric winding patterns can alternatively be used instead. Preferably, though not specifically illustrated to simplify the drawing of the trace pattern shown in FIG. 2, the chosen pattern should use a copper trace that collectively occupies as much of the printed circuit board space then available, as practical, for the pattern with as little excess space remaining. Furthermore, though FIG. 3 shows two daughter boards 233 and 235, the secondary winding could be formed alternatively by a trace pattern existing on just one daughter board—in which case just one such board would be used—or through suitable patterns on a suitable number of boards in excess of two and positioned on one or both sides of the main board and hence situated above and/or below the primary winding.

Although one embodiment which incorporates the teachings of the present invention has been shown and described in detail herein, those skilled in the art can readily devise many other embodiments, modifications and applications of the present invention that still utilize these teachings.

We claim:

1. A mechanical arrangement for implementing a micro-inverter, the arrangement comprising:
   a circuitry assembly having:
      a transformer comprised of top and bottom abutting core halves; and
      a first compressive thermally-conductive pad situated along and in abutting thermal contact with a top surface of the top core half;
   a chopper device assembly having:
      a thermally conductive plate situated in abutting thermal contact with both a bottom surface of the bottom core half and with a plurality of chopper devices so as to conduct heat away from both the bottom core half and the chopper devices, the chopper devices being mechanically mounted to the conductive plate; and
      a second compressive thermally-conductive pad situated along and in abutting thermal contact with a bottom surface of the conductive plate; and
   a single enclosure, formed of top and base portions having corresponding first and second internal cavities, for housing both the circuitry and the chopper device assemblies; and
   wherein each of the first and second internal cavities has a corresponding predefined depth and the conductive plate has a predefined thickness such that, when the top and base portions of the enclosure are secured together to form the single enclosure containing the circuitry and chopper device assemblies, the first and second conductive pads contact and abut against opposing inner surfaces of respectively the enclosure top and base portions so as to passively conduct heat away from both the top core half and the chopper assembly to, respectively, the inner surfaces of the enclosure top and base portions, and the top and base portions of the enclosure collectively exert a sufficient mechanical force on abutting portions of the first and second core halves to drive the core halves together so as to substantially eliminate any air gap that would otherwise form there between.

2. The arrangement recited in claim 1 wherein the predefined depth of each of the first and second cavities and the predefined thickness of the conductive plate are such as to accommodate height of all circuitry components mounted on the thermally conductive plate and to compress the first and second thermally-conductive compressive pads.

3. The arrangement recited in claim 2 wherein the top and base portions of the enclosure are formed of a thermally-conductive material.

4. The arrangement recited in claim 3 wherein the thermally conductive plate is formed of aluminum.

5. The arrangement recited in claim 4 wherein the conductive plate is approximately 0.125 inches (approximately 0.32 cm) thick.

6. The arrangement recited in claim 3 wherein the top and base portions of the enclosure are formed from aluminum.

7. The arrangement recited in claim 3 wherein the enclosure is approximately 1.25 inches (approximately 3.2 cm) thick.

8. The arrangement recited in claim 3 wherein electrical leads associated with the chopper devices extend upwardly from the chopper devices and physically terminate on the thermally conductive plate.

9. The arrangement recited in claim 3 wherein the transformer is a planar transformer having primary and secondary windings, the primary and secondary windings being formed by separate first and second wiring trace patterns situated on a first printed circuit board and a second printed circuit board, respectively, with the second circuit board situated adjacent to and oriented parallel to the first printed circuit board, and the first and second abutting core halves collectively extending, in a substantially perpendicular direction, through both the first and second printed circuit boards.

10. The arrangement recited in claim 9 wherein the top and bottom abutting core halves are each E-shaped.

11. The arrangement recited in claim 10 wherein the thermally conductive plate is formed of aluminum.

12. The arrangement recited in claim 11 wherein the conductive plate is approximately 0.125 inches (approximately 0.32 cm) thick.

13. The arrangement recited in claim 10 wherein the top and base portions of the enclosure are formed from aluminum.

14. The arrangement recited in claim 10 wherein the enclosure is approximately 1.25 inches (approximately 3.2 cm) thick.

15. The arrangement recited in claim 10 wherein electrical leads associated with the chopper devices extend upwardly from the chopper devices and physically terminate on the thermally conductive plate first circuit board.

* * * * *